United States Patent [19]

Vollath

[11] 4,350,884
[45] Sep. 21, 1982

[54] AUTOMATIC FOCUSING OF EVERY IMAGE POINT IN AN IMAGE

[75] Inventor: Dieter Vollath, Stutensee-Friedrichstal, Fed. Rep. of Germany

[73] Assignee: Kernforschungszentrum Karlsruhe Gesellschaft mit beschrankter Haftung, Karlsruhe, Fed. Rep. of Germany

[21] Appl. No.: 131,845

[22] Filed: Mar. 19, 1980

[30] Foreign Application Priority Data

Mar. 20, 1979 [DE] Fed. Rep. of Germany ....... 2910875

[51] Int. Cl.³ .............................................. G01J 1/36
[52] U.S. Cl. .................................... 250/204; 250/201
[58] Field of Search .............. 250/204, 201; 354/25 R; 356/4

[56] References Cited

U.S. PATENT DOCUMENTS 4,247,762  1/1981  Wilwerding ........................ 250/204

Primary Examiner—David C. Nelms
Assistant Examiner—Darwin R. Hostetter
Attorney, Agent, or Firm—Spencer & Kaye

[57] ABSTRACT

Every image point of an image of a sample formed by an optical objective, is focussed by, for each image point, deriving a representation of the autocorrelation function of the brightness distribution of the image of that image point, deriving a representation of the average of the autocorrelation function of the brightness distribution of a plurality of image points in the region of that image point, deriving a representation constituting a function of the quotient formed by dividing the representation of the autocorrelation function for that image point by the representation of the average of the autocorrelation function, and varying the distance between the objective and the sample while iteratively performing the above steps of deriving for determining the distance at which the function of the quotient has a maximum value.

4 Claims, 7 Drawing Figures

AUTOMATIC FOCUSING OF EVERY IMAGE POINT IN AN IMAGE

BACKGROUND OF THE INVENTION

The present invention relates to a method and an apparatus for automatic focusing of every image point in an image in a system in which the image is being observed by means of an objective.

In the manufacture and evaluation of multiphase substances, such as, for example, nuclear fuel plates made of mixtures of uranium dioxide and plutonium dioxide, as they are used, for example, for fast breeder reactors, or in the case of plutonium recovery for light water reactors, the distribution of the, e.g., plutonium is different in each manufacturing process. In the case where the manufacturing process or treatment of a starting powder does not impose substantial mixed crystal formation, the plutonium distribution may become inhomogeneous. In such a case there is a need for the manufacturer to learn how the plutonium is distributed in order to draw conclusions therefrom regarding the manufacturing process. The fuel customer, on the other hand, wants to know whether the plutonium in the plates is indeed present in the required homogeneous distribution. If, now, homogeneity or the distribution of a second phase is to be quantified, it is the general practice to utilize the deviation of the concentration from a given standard or a distribution parameter derived therefrom as the measuring index.

If during automatic image analysis more than one sample point is to be examined, it is necessary to displace the sample. It is then assumed that the sample remains continuously at the same distance in front of the objective lens of an observation microscope or of a television camera. If this is not the case with certainty, the image will be out of focus and thus the measuring result will be wrong. To prevent this, the image must be refocused again and again.

SUMMARY OF THE INVENTION

It is thus an object of the present invention to achieve automatic focusing of a microscope image with the use of an image analyzer so as to make it possible to perform automatic analysis of samples even if these smples are not entirely planar.

This and other objects are achieved, according to the invention by the provisions of a method and apparatus for automatically focussing every image point of an image of a sample formed by an optical objective, which performs, for each image point, the steps of deriving a representation of the autocorrelation function of the brightness distribution of the image of that image point, deriving a representation of the average of the autocorrelation function of the brightness distribution of a plurality of image points in the region of that image point, deriving representation constituting a function of the quotient formed by dividing the representation of the autocorrelation function for that image point by the representation of the average of the autocorrelation function, and varying the distance between the objective and the sample while iteratively performing the steps of deriving for determining the distance at which the function of the quotient has a maximum value.

DESCRIPTION OF THE PREFERRED EMBODIMENTS

Figure 1:
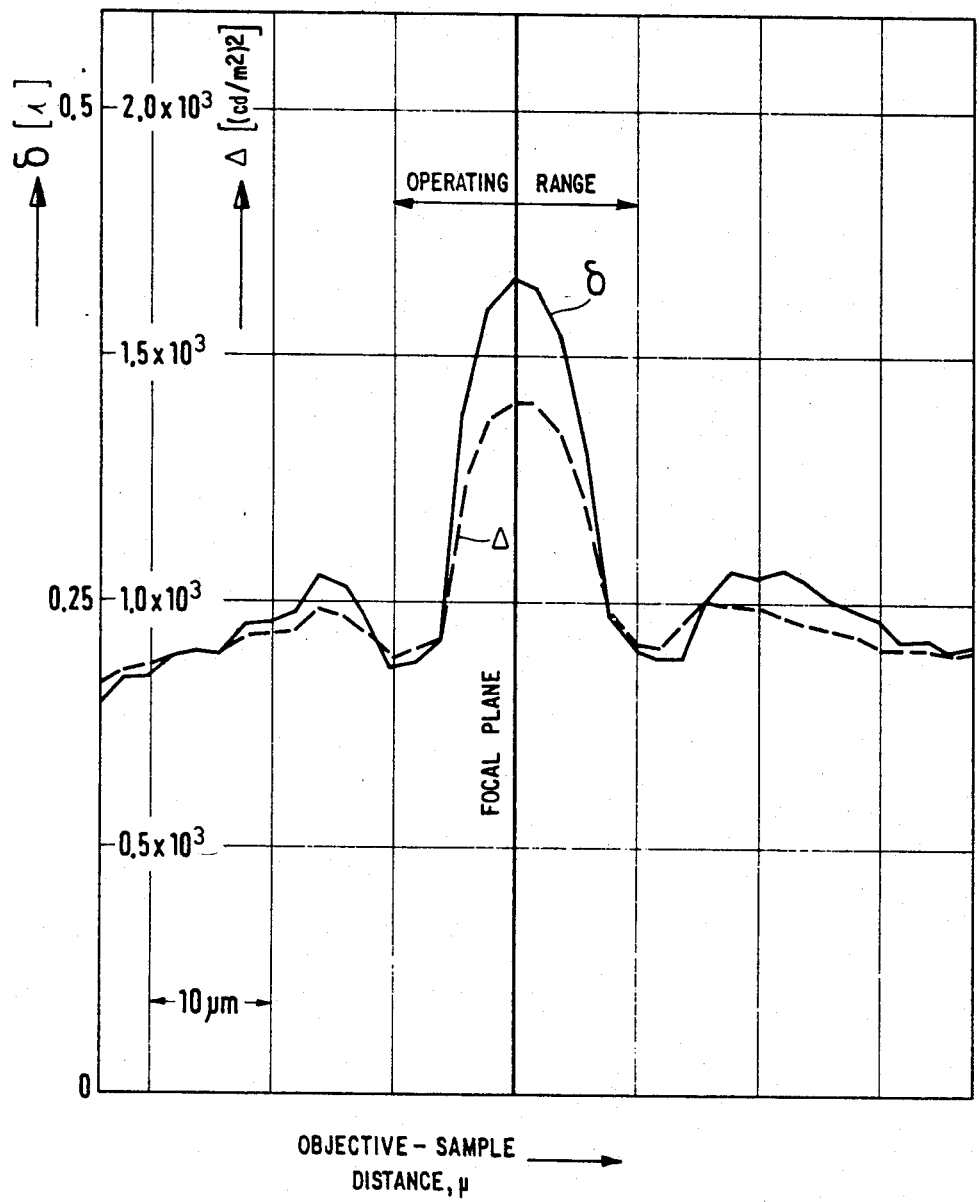
FIGS. 1-4 are diagrams illustrating image brightness correlation function parameters as a function of objective lens-to-subject distance for four different objective lenses and utilized to explain the principles of the invention.
Figure 2:
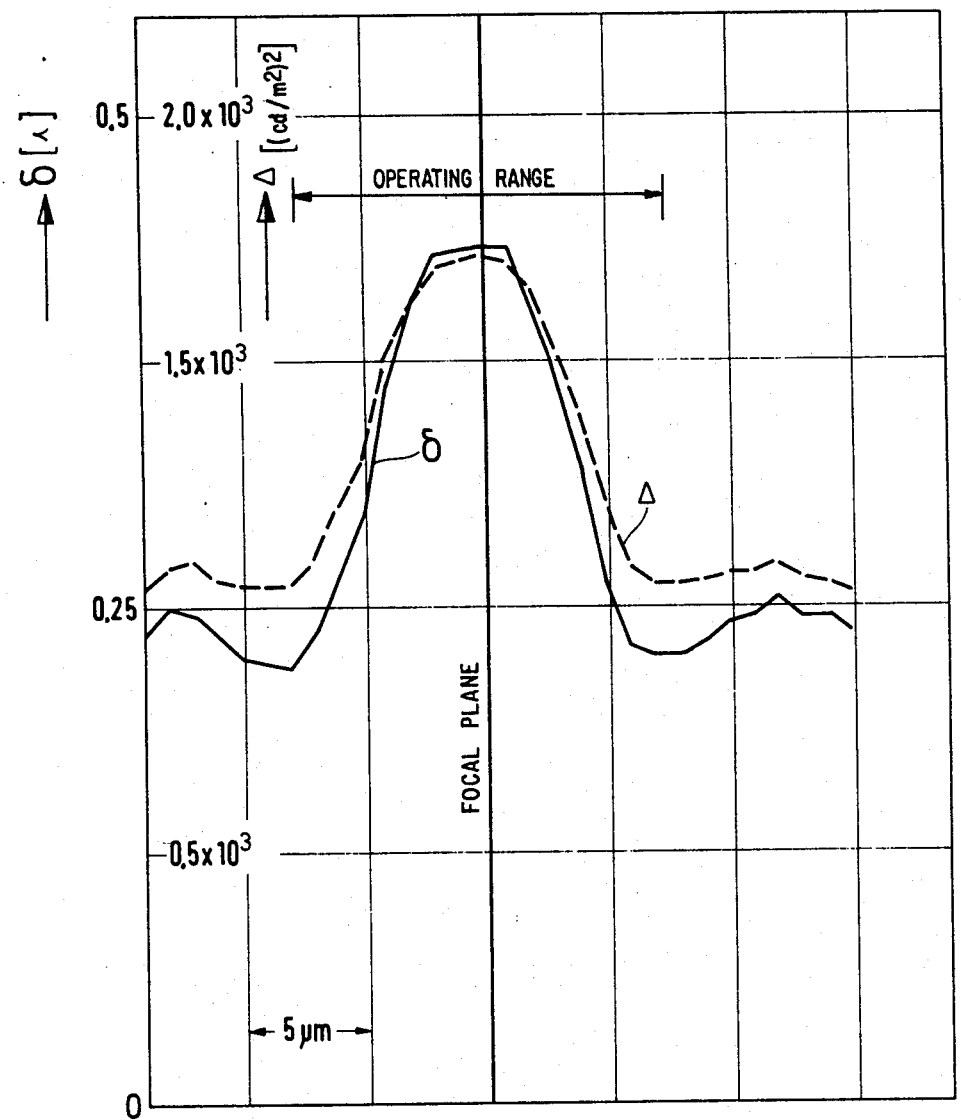
Figure 3:
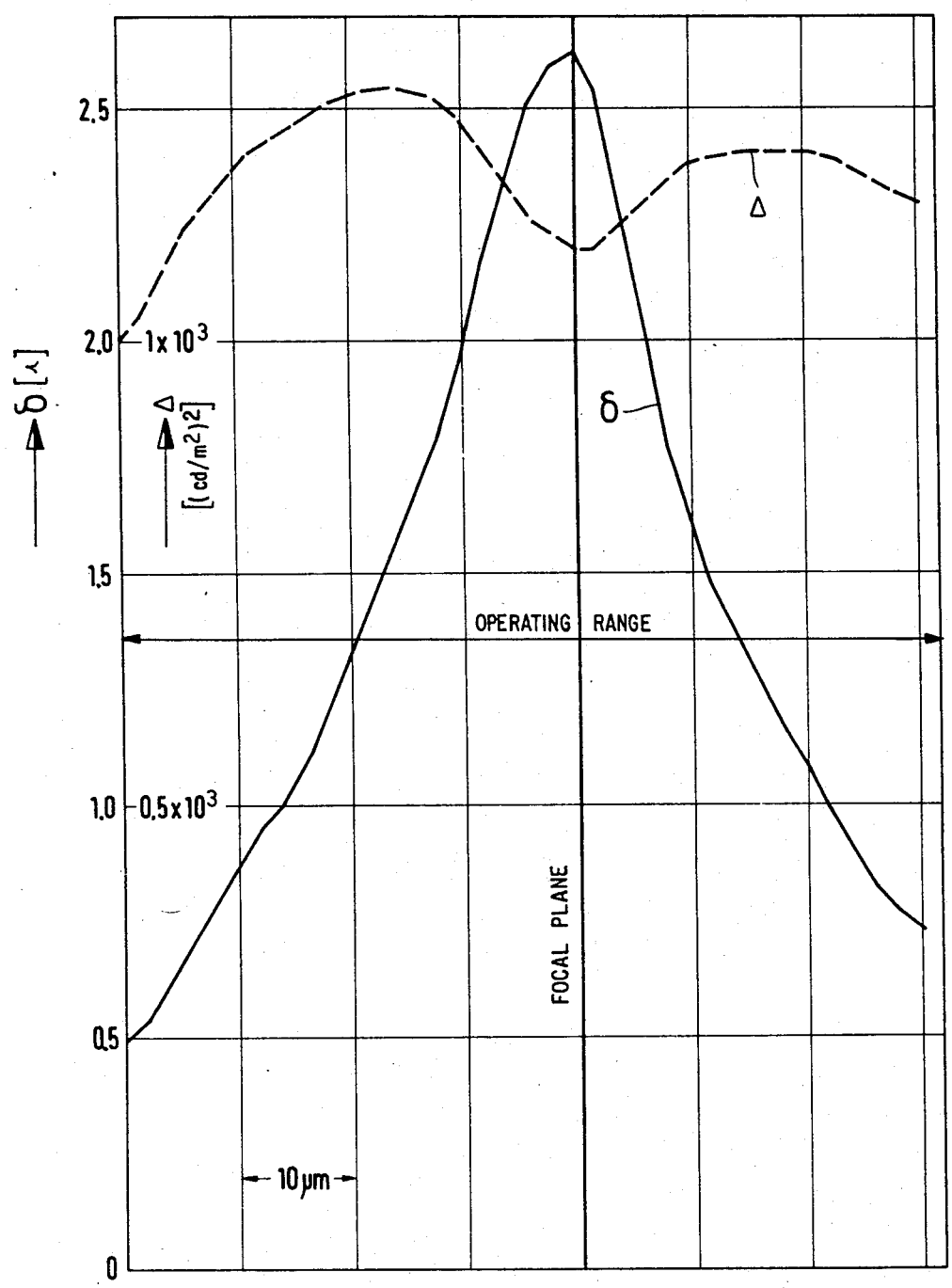
Figure 4:
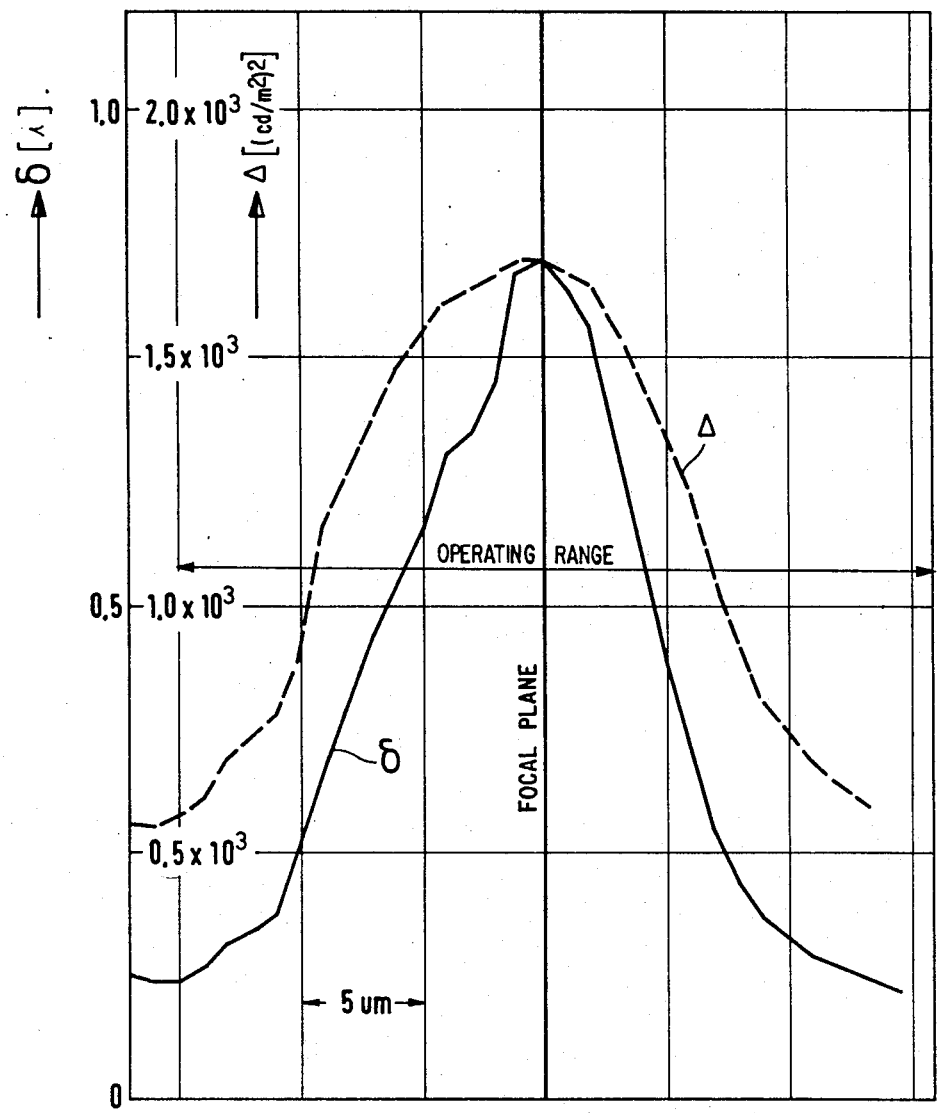

In observation procedures of the type contemplated by the invention, if adjacent image points are observed, the difference in brightness between each two adjacent image points is greatest when the image is sharply focused. Thus, if the autocorrelation function of the brightness distribution of an image is calculated at one point, having for example the coordinates (0,0), and this function value is compared with the average of the autocorrelation function of the image, the above considerations lead to the conclusion that the difference of the two function values must be a maximum for a sharply focused image.

The autocorrelation function $F(x,y)$ of a brightness distribution function $f(u,v)$ is defined as $$F(x,y) = \int_{-\infty}^{\infty} \int_{-\infty}^{\infty} f(u,v) f^+(u+x, v+y) \, du \, dv \quad (1)$$

where $f^+$ is the conjugated complex function of $f(u,v)$.

$(u,v)$ are the coordinates of the plane of the image, and $(x,y)$ are the coordinates of the plane of the correlation function.

Since the function $f(u,v)$ is zero in the whole plane $(u,v)$ except within the range, where the image is defined and the function $f(u,v)$ does not diverge, the above mentioned integral exists for every experimentally possible case.

If it is assumed that the function $f(u,v)$ is different from zero and real only in the region $0 \leq u \leq a$ and $0 \leq v \leq b$, the integral (1) is simplified to $$F(x,y) = \int_{-a}^{a} \int_{-b}^{b} f(u,v) f(u+x, v+y) \, du \, dv \quad (2)$$

For a real function $f_{30}$ is equal to $f$. Thus an optimally sharp image is obtained if the condition $$\Delta = F(0,0) - \overline{F(X,Y)} = \text{maximum has been met} \quad (3)$$

where $F(X,Y)$ ... is the value of the autocorrelation function at point $(X,Y)$.

Herein, a bar over a term signifies the average value of that term.

A further characteristic of the autocorrelation function is that $$F(0,0) = \sigma^2 + \mu^2 \text{ and } \overline{F(X,Y)} = \mu^2$$

so that $$\Delta = \sigma^2 \quad (4)$$

with P1 σ=standard deviation of the brightness distribution, and
μ=average value of the brightness in the image.

The illustrated result is also quite informative. It indicates that the standard deviation of the brightness is at a maximum with a sharply focused image.

The broken line curves in FIGS. 1, 2, 3 and 4 show the value of Δ as a function of the distance of the sample, or subject, from the objective of the optical system. Each Figure relates to measurements made with a respective one of two transmitted light objectives manufactured by the firm Leitz and two incident light objectives manufactured by the firm Reichert. While in FIGS. 1, 2 and 4 the value Δ indeed achieves a maximum this cannot be observed in FIG. 3 which shows a curve configuration that has also been found with another sample and another objective. The form of the Δ function curves depends greatly on the preparation. The dimensions of Δ and δ are:

Δ[(cd/m$^2$)$^2$]

δ dimensionless [1]

A deviation from the theoretically expected curve is produced because with the changing distance between objective and sample the degree of enlargement also changes. That inevitably also changes the image content. This problem can be circumvented if instead of the functions $\Delta = \sigma^2$, the standardized function $$\delta = \frac{\Delta}{\mu^2} = \frac{\sigma^2}{\mu^2} \qquad (5)$$

is used.

In FIGS. 1, 2, 3 and 4 the corresponding function δ is shown by a solid line curve. It can be seen that now there also is a clear maximum even in the case of FIG. 3. In the cases shown in FIGS. 1, 2 and 4, the maximum of the δ function is more distinct than that of the Δ function.

Figure 5:
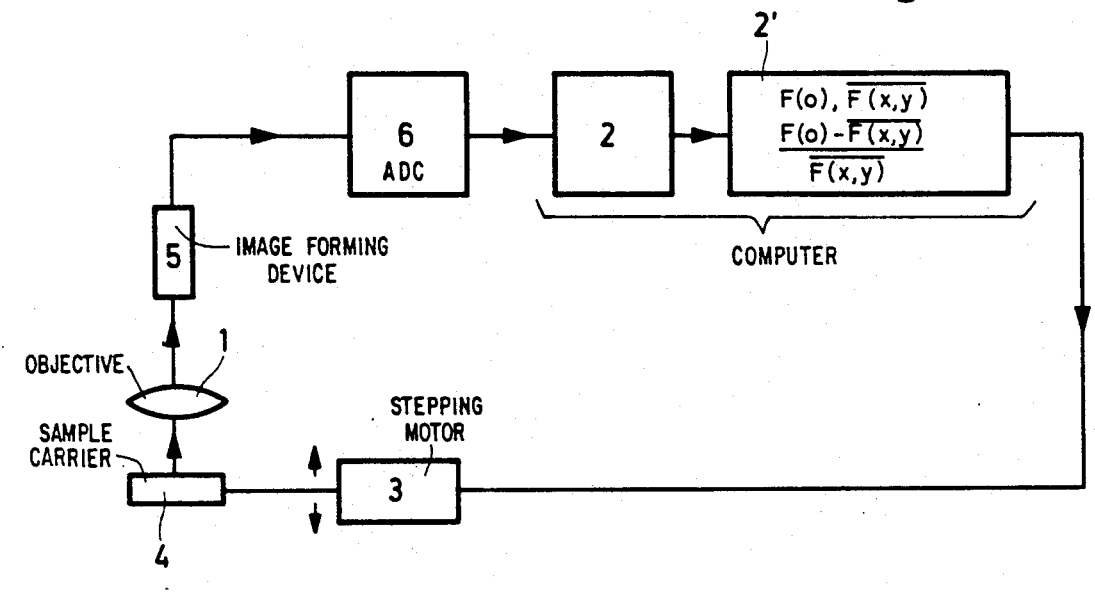
FIG. 5 is a block diagram of a preferred embodiment of a system implementing the invention.

The δ function can be determined by a densitometric measurement of the image, or object surface. To assemble an automatic device, such as the arrangement shown in FIG. 5, for focusing a microscope, by adjusting its objective 1, it is only necessary to repeatedly, or iteratively, find the maximum of the function δ. This can be realized in practice by coupling a stepping motor 3 to the focusing drive of the objective 1 of a microscope or television camera 5, with a process computer 2, 2', such as a PDP 11/03 C Digital Equipment Corp., Maynard, Mass., U.S.A.) set to calculate equation (3). All commercially available objectives which were considered were found to have an operating range (s. FIGS. 1–4) greater than the unevenness of the samples 4.

The motor 3 is a stepping motor ZSS32 by Phytron-Elektronik GmbH, Gröbenzell, West-Germany, which can be coupled either to the objective 1 or the carrier 4. The mode of coupling is dependent of the design of the instrument.

The operating ranges of an automatic focusing device when using the objectives employed to derive the curves of FIGS. 1 through 4 are listed in the following table:

| Objective 1 | Operating Range | |
|---|---|---|
| LEITZ (FIG. 1) 16 × | −10 ... + 16 μm | Deviation from the focal plane |
| LEITZ (FIG. 2) 25 × | −8 ... + 8 μm | Deviation from the focal plane |
| REICHERT (FIG. 3) 16 × | −40 ... + 32 μm | Deviation from the focal plane |
| REICHERT (FIG. 4) 40 × | −15 ... + 13 μm | Deviation from the focal plane |

The present method for focusing can be used not only for image analyzers but also for any type of electrical image transmission, as, for example, with a TV camera 5 and scanning electron microscopes. In this case, the relationship (6) is utilized:

$$\Delta = \frac{F(o) - \overline{F}}{F} = \frac{\mu^2 + \sigma^2 - \mu^2}{\mu^2}, \qquad (6)$$

where F(o)=F(0,0) and $\overline{F}=\overline{F(X,Y)}$, and an electrical voltage u represents the brightness signal for every image point. This results in the relationship:

$$\Delta = \frac{\Sigma u^2 - (\Sigma u)^2}{(\Sigma u)^2} = \frac{\overline{u^2}}{\overline{u}^2} - 1 \qquad (7)$$

Since the value 1 constitutes only a constant shift, it can be left out. Thus the simplified equation 8 applies:

$$\Delta = \frac{\overline{U^2}}{\overline{U}^2} \qquad (8)$$

Figure 6:
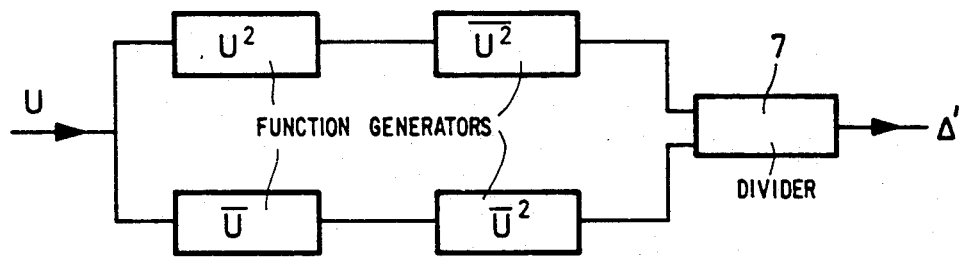
FIGS. 6 and 7 are block diagrams of alternative embodiments of one of the components of the system of FIG. 5.
Figure 7:
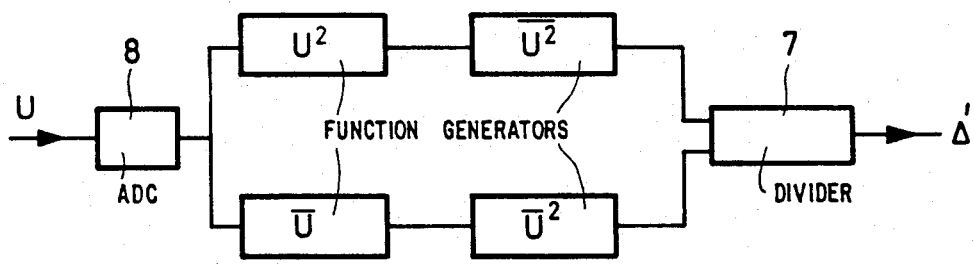

Automatic calculation of the equation can be implemented in two ways. FIG. 6 depicts an analog processing circuit where the values U$^2$ and $\overline{U^2}$, as well as $\overline{U}$ and $\overline{U}^2$ are derived from the voltage U and equation (8) is solved by means of a divider 7. FIG. 7 shows digital processing, where conversion takes place first by means of an analog/digital converter 8 and then the result is processed to form the equation terms $\overline{U^2}$ and $\overline{U}^2$, whereupon the quotient of those terms is formed in the divider 7' according to equation (8).

Then the stepping motor 3 and a peak search device (not shown in detail) must search out the maximum of Δ' (equation 8).

It is to be understood that the above description of the present invention is susceptible to various modifications, changes and adaptations, and the same are intended to be comprehended within the meaning and range of equivalents of the appended claims.

What is claimed is:

1. A method for automatically focusing every image point of an image of a sample formed by an optical objective, comprising, for each image point: deriving a representation of the autocorrelation function of the brightness distribution of the image of that image point; deriving a representation of the average of the auto correlation function of the brightness distribution of a plurality of image points in the region of that image point; deriving a representation constituting a function of the quotient formed by dividing the representation of said autocorrelation function for that image point by the representation of said average of the autocorrelation function; and varying the distance between the objective and the sample while iteratively performing said steps of deriving for determining the distance at which said function of the quotient has a maximum value.

2. A method as defined in claim 1 wherein, for each image point, said step of deriving a representation constituting a function of the quotient comprises deriving a representation of the difference between the representation of said autocorrelation function for that image point and the representation of said average of the autocorrelation function, and deriving a representation constituting the quotient formed by dividing said difference representation by the representation of said average of the autocorrelation function.

3. A method as defined in claim 1 or 2 comprising the preliminary step of deriving a voltage representing the brightness of the image formed by the objective, and performing said steps of deriving in response to the values of said voltage.

4. Apparatus for performing the method as defined in claim 3 comprising computing means connected for receiving said voltage and performing said steps of deriving in response thereto, and means including a stepping motor connected to respond to the output of said computing means and to vary the distance between the objective and the sample.

* * * * *